United States Patent
Roggeman et al.

(10) Patent No.: US 12,410,274 B2
(45) Date of Patent: Sep. 9, 2025

(54) ANIONIC DISPERSION POLYMERIZATION PROCESS TO MAKE RANDOM COPOLYMER RUBBER

(71) Applicant: Bridgestone Americas Tire Operations, LLC, Nashville, TN (US)

(72) Inventors: David M. Roggeman, North Royalton, OH (US); James J. Kuhel, III, Stow, OH (US); Terrence E. Hogan, Uniontown, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 189 days.

(21) Appl. No.: 17/768,728

(22) PCT Filed: Oct. 14, 2020

(86) PCT No.: PCT/US2020/055602
§ 371 (c)(1),
(2) Date: Apr. 13, 2022

(87) PCT Pub. No.: WO2021/076640
PCT Pub. Date: Apr. 22, 2021

(65) Prior Publication Data
US 2024/0158561 A1    May 16, 2024

Related U.S. Application Data

(60) Provisional application No. 62/914,770, filed on Oct. 14, 2019.

(51) Int. Cl.
*C08F 236/06* (2006.01)
*C08F 212/08* (2006.01)
(Continued)

(52) U.S. Cl.
CPC ........ *C08F 297/044* (2013.01); *C08F 212/08* (2013.01); *C08F 236/06* (2013.01); *C08F 236/10* (2013.01); *C08F 297/023* (2013.01)

(58) Field of Classification Search
None
See application file for complete search history.

(56) References Cited

U.S. PATENT DOCUMENTS

| 3,948,846 A | 4/1976 | Waters |
| 5,891,947 A * | 4/1999 | Hall ............... C08F 297/04 526/201 |

(Continued)

FOREIGN PATENT DOCUMENTS

| EP | 0603668 A1 | 6/1994 |
| EP | 3434699 A1 | 1/2019 |

(Continued)

OTHER PUBLICATIONS

PCT International Application No. PCT/US2020/055602 International Search Report dated Feb. 2, 2021.

(Continued)

*Primary Examiner* — Richard A. Huhn
(74) *Attorney, Agent, or Firm* — Meredith E. Hooker; Stephanie M. Williams

(57) ABSTRACT

Embodiments are directed to anionic rubber polymerization processes conducted in a non-aqueous dispersion utilizing conjugated diene and vinyl aromatic monomers and a dispersing agent formed in-situ during the polymerization process.

20 Claims, 1 Drawing Sheet

(51) Int. Cl.
*C08F 236/10* (2006.01)
*C08F 297/02* (2006.01)
*C08F 297/04* (2006.01)

(56) References Cited

U.S. PATENT DOCUMENTS

| | | | |
|---|---|---|---|
| 6,303,721 | B1 | 10/2001 | Lätch et al. |
| 2015/0065619 | A1* | 3/2015 | Wissel .................. C08F 297/04 524/68 |
| 2018/0134830 | A1 | 5/2018 | Dorato et al. |
| 2022/0106421 | A1* | 4/2022 | Kuhel, III ............... C08L 21/00 |

FOREIGN PATENT DOCUMENTS

| | | | |
|---|---|---|---|
| EP | 3471971 | B1 | 10/2019 |
| JP | 61255908 | S | 11/1986 |
| JP | H07-233228 | A | 9/1995 |

OTHER PUBLICATIONS

Extended European Search Report for EP application No. 2087560.9 dated Oct. 25, 2023.
Japanese Office Action issued in JP Patent Application No. 2022-522594 dated Jul. 4, 2023.

\* cited by examiner

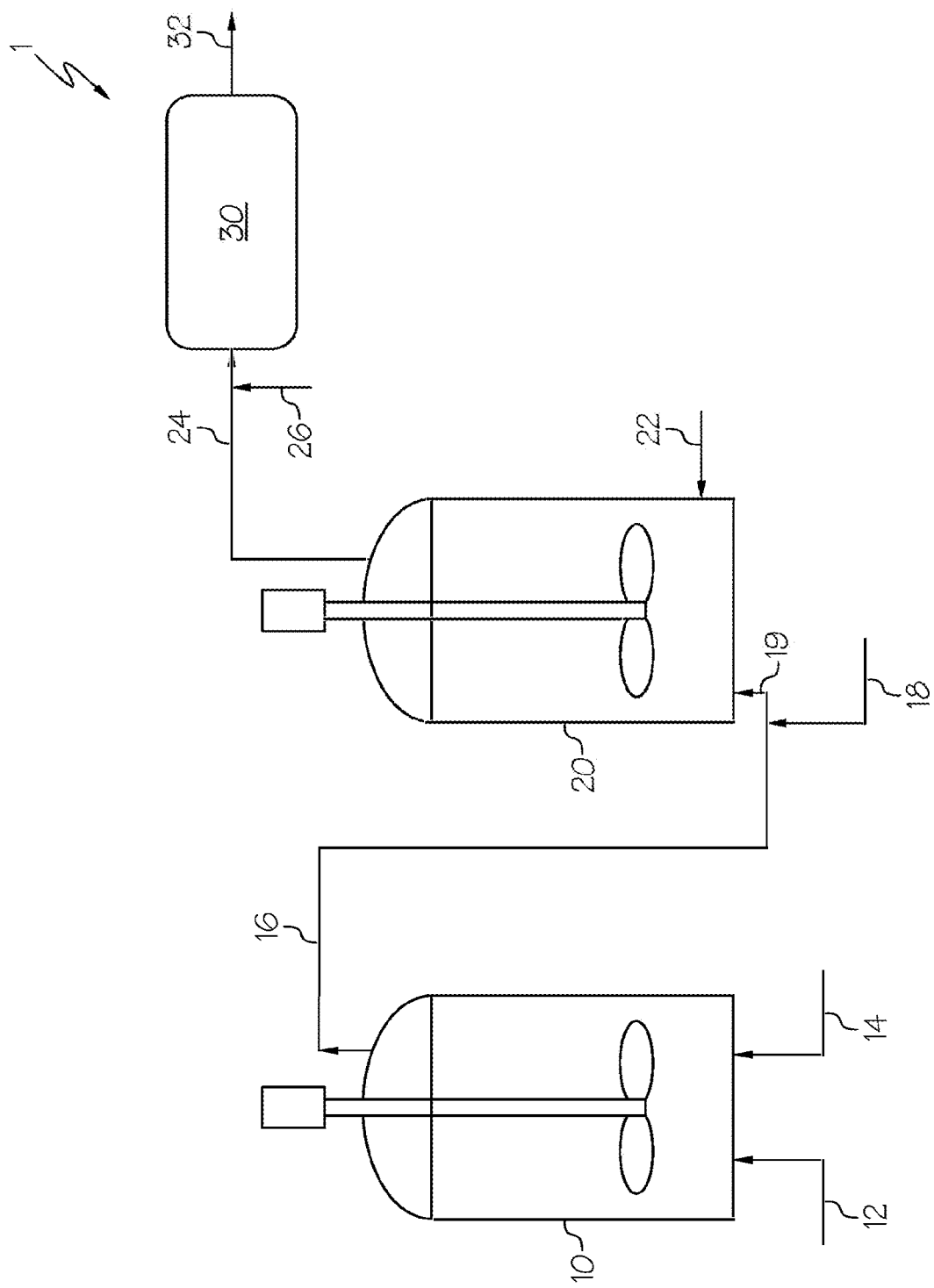

ANIONIC DISPERSION POLYMERIZATION PROCESS TO MAKE RANDOM COPOLYMER RUBBER

CROSS-REFERENCE TO RELATED APPLICATIONS

This application is a 35 U.S.C. § 371 national stage application of International Application No. PCT/US2020/055602, filed on Oct. 14, 2020, which claims priority to U.S. Provisional Application No. 62/914,770, filed on Oct. 14, 2019, which are both incorporated by reference herein in their entireties.

TECHNICAL FIELD

Embodiments of the present disclosure are generally related to anionic rubber polymerization processes conducted in a non-aqueous dispersion utilizing conjugated diene and vinyl aromatic monomers and a dispersing agent formed in-situ during the polymerization process.

BACKGROUND

Random rubber copolymers, for example, random styrene-butadiene rubbers (SBR) having a styrene content greater than 35%, are more typically polymerized via solution polymerization in aromatic or cycloaliphatic solvents, in contrast to solvents insoluble to SBR such as hexane or other aliphatic solvents. That said, U.S. Pat. No. 5,891,947, which is incorporated by reference herein in its entirety, discloses polymerizing styrene and butadiene monomer in a non-aqueous dispersion to produce random SBR rubbers having 35 to 70% by weight of styrene monomer. In this process, polymerization is conducted by a two polymerization reactor anionic dispersion polymerization process in which a soluble dispersing agent is formed in the first polymerization reactor and an insoluble dispersing agent is formed in the second polymerization reactor.

This process can yield a dispersion product having at least 20% solids, which is desirable from an industrial need standpoint. In addition to higher solids content, it is further desirable to increase the molecular weight and Mooney viscosity of the random SBR in the product of the second polymerization reactor, because it can increase wear resistance in the random SBR and products incorporating the random SBR. However, gelling and reactor fouling can result when increasing the molecular weight of the dispersion product. This gelling is further exacerbated in a continuous process.

Accordingly, a continual need exists for an improved reactor anionic dispersion polymerization process which yields a higher molecular weight random SBR at higher solids content.

SUMMARY

Embodiments of the present disclosure meet these dual needs of increased solids content and increased molecular weight in an anionic dispersion polymerization process. Specifically, the present embodiments are directed to processes for producing random SBR utilizing anionic dispersion polymerization in a two reactor. Without being bound by theory, ensuring that least 8% by weight of total monomer is added in the first polymerization reactor plays a pivotal role in ensuring that the present process yields increased solids content and increased molecular weight without causing gelling and reactor fouling.

According to one embodiment, a process for producing a copolymer by anionic dispersion polymerization is provided. The process comprises adding to a first polymerization reactor: a first monomer charge comprising a first conjugated diene monomer and optionally a first vinyl aromatic monomer; organolithium polymerization initiator; and a non-aqueous dispersing medium. The first monomer charge is polymerized to form a first block of a dispersing agent, the first block being soluble in the non-aqueous dispersing medium, and at least 8% by wt. of total monomer is provided by the first monomer charge, the total monomer being the sum of all monomer charges (e.g., the sum of the first monomer charge and a second monomer charge). The process further comprises adding to a second polymerization reactor: the first block, the non-aqueous dispersing medium, the second monomer charge comprising a second vinyl aromatic monomer and a second conjugated diene monomer; and organolithium polymerization initiator. The second monomer charge is polymerized to form the copolymer, the copolymer being the polymerized reaction product of at least 30% by weight of the second vinyl aromatic monomer and at least 10% by weight of the second conjugated diene monomer. The second polymerization reactor produces an outlet stream comprising the copolymer product and the second block of the dispersing agent, the second block being insoluble in the non-aqueous dispersing medium and linked with the first block to form the dispersing agent. The dispersing agent disperses the copolymer in the non-aqueous dispersing medium. The process may further comprise adding coupling agent into the outlet stream, wherein the coupling agent attaches to the copolymer to increase the Mooney viscosity of the copolymer.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

BRIEF DESCRIPTION OF THE DRAWING

The following detailed description of specific embodiments of the present disclosure can be best understood when read in conjunction with the drawing enclosed herewith.

The FIGURE is a schematic description of the anionic dispersion polymerization process according to one or more embodiments of the present disclosure.

The embodiments set forth in the drawing are illustrative in nature and not intended to be limiting of the embodiments defined by the claims. Moreover, individual features of the drawing will be more fully apparent and understood in view of the detailed description.

DETAILED DESCRIPTION

Definitions

As used herein, the "copolymer" or "copolymer rubber" refers to copolymers prepared by the continuous copolymerization of at least one conjugated diene monomer and at least one vinyl aromatic monomer. "Copolymer" may encompass the polymerized reaction product of two or more than two monomers.

As used herein, a "random copolymer" is a copolymer of a conjugated diene monomer and a vinyl aromatic monomer (VAM) in which no more than 5% by weight of the copolymer is composed of VAM blocks of 10 or more VAM units. Similarly, a "random SBR" is a copolymer of butadiene and styrene monomers in which no more than 5% by weight of the copolymer is composed of styrene blocks of 10 or more styrene units.

As used herein, "first block", "A block", "Block A" and "A" may be used interchangeably as subcomponents of the dispersing agent. Similarly as used herein, the "second block", "B block", "Block B" and "B" may be used interchangeably as subcomponents of the dispersing agent.

As used herein, "charge", "manifold", and "feed" may be used interchangeably as a reactant stream introduced into the first and/or second polymerization reactor.

As used herein, "percent (%) solids" is defined by the following formula:

$$\% \text{ Solids} = ((\text{Polymer weight})/\text{Total Weight of Solution})*100\%.$$

Embodiments of the present disclosure are directed to a process for producing a copolymer by anionic dispersion polymerization. Referring to the embodiment of FIG. 1 the FIGURE, the process 1 includes adding to a first polymerization reactor 10 a first monomer charge 14 comprising a first conjugated diene monomer and optionally a first vinyl aromatic monomer. While the FIGURE_depicts the first conjugated diene monomer and a first vinyl aromatic monomer as being fed in one stream (first monomer charge 14), it is contemplated that the monomers could be delivered to the first polymerization reactor 10 in separate feed streams. As further shown in the FIGURE, a second feed stream 12 for the first polymerization reactor 10 comprises organolithium polymerization initiator and a non-aqueous dispersing medium. Again, while the embodiment of the FIGURE depicts feed components organolithium polymerization initiator and a non-aqueous dispersing medium being fed in one stream (e.g., stream 12), it is contemplated that these feed components could be delivered to the first polymerization reactor 10 in separate feed streams.

Referring again to the FIGURE, additional components may be fed to the first polymerization reactor 10, for example, a randomizing agent or modifying agent as described further below. In one embodiment, a randomizing agent is delivered with the first conjugated diene monomer and first vinyl aromatic monomer in the first monomer charge 14 stream. In further embodiment, the randomizing agent may be added to the first polymerization reactor, the second polymerization reactor as described below, or both.

In operation, the first monomer charge 14 in the first polymerization reactor 10 is polymerized to form a first block 16 of a dispersing agent, wherein the first block 16 is soluble in the non-aqueous dispersing medium. As described further below, at least 8% by wt. of total monomer is provided by the first monomer charge 14, wherein the total monomer is the sum of the first monomer charge 14 and a second monomer charge 22. In further embodiments, at least 10% by wt. of total monomer is provided by the first monomer charge 14. Said another way, the first monomer charge 14 may deliver from 8% to 20% by wt. of the total monomer to the first polymerization reactor 10, or from 10 to 20% by wt., or from 8% to 20% by wt. In one or more embodiments, the first monomer charge comprises 75 to 98% by weight first conjugated diene monomer, and 2 to 25% by weight first vinyl aromatic monomer. In one or more embodiments, the first monomer charge comprises 75 to 100% by weight first conjugated diene monomer, and 0 to 25% by weight first vinyl aromatic monomer.

Maintaining at least 8% by wt. of total monomer in the first polymerization reactor 10 ensures that sufficient amount of first block 16 is produced in the first polymerization reactor 10. Without being limited to theory, controlling the amount of produced first block 16, which may be considered as the seed polymer, helps control the composition and the viscosity of the product of the second polymerization reactor 20, and reduces gelling concerns with increased molecular weight in the second reactor as well as during the optional in-line addition of coupling agent downstream of the second polymerization reactor 20.

Referring again to the FIGURE, the first block 16 is subsequently fed to a second polymerization reactor 20. In addition to the first block 16, the second monomer charge 22 comprising a second vinyl aromatic monomer and a second conjugated diene monomer is fed to the second polymerization reactor 20. In most embodiments, the first and second vinyl aromatic monomers are compositionally the same and the first and second conjugated diene monomers are also compositionally the same. However, it is contemplated that the monomer compositions could vary in alternative embodiments.

Referring again to the FIGURE, organolithium polymerization initiator 18 is also fed to the second polymerization reactor 20. In one embodiment, this organolithium polymerization initiator 18 is depicted in the FIGURE as being mixed with the first block 16 upstream of the second polymerization reactor 20 to produce a combined stream 19 comprising the first block 16 and organolithium polymerization initiator 18. In alternative embodiments, it is contemplated that the organolithium polymerization initiator 18 may be fed to the second polymerization reactor 20 separately from the first block 16. Similar to the feed to the first polymerization reactor 10, additional components may be fed to the second polymerization reactor 20, for example, a randomizing agent or modifying agent as described further below. In one embodiment, a modifying agent is delivered with the second conjugated diene monomer and second vinyl aromatic monomer in the second monomer charge 22 stream. In further embodiments, the modifying agent may be added to the first polymerization reactor, the second polymerization reactor, or both.

Within the second polymerization reactor 20, the second vinyl aromatic monomer and the second conjugated diene monomer of the second monomer charge 22 is polymerized to form the copolymer, which is the polymerized reaction product of at least 30% by weight of the second vinyl aromatic monomer and at least 10% by weight of the second conjugated diene monomer. In further embodiments, the copolymer may include at least 33%, at least 35%, or at least 38% by weight of the second vinyl aromatic monomer and at least 15%, at least 20%, at least 25%, at least 30%, or at least 35% by weight of the second conjugated diene monomer.

Referring again to FIG. 1, in addition to the copolymer, the outlet stream 24 of the second polymerization reactor 20 also comprises a second block of the dispersing agent. The second block of the dispersing agent is insoluble in the non-aqueous dispersing medium and is linked with the first block to form the dispersing agent. The dispersing agent disperses the copolymer in the non-aqueous dispersing medium in the outlet stream 24. Within the outlet stream 24, the copolymer may be considered a living copolymer as the polymerization reactor has not been terminated. In one or more embodiments, the outlet stream 24 may comprises from 15 to 30% by weight of solids, from 15 to 25% by weight of solids, or from 20 to 25% by weight of solids.

The dispersing agents useful in the present disclosure are polyblock copolymers, in that they are selected from a variety of polymers containing at least two blocks linked by chemical valences wherein at least one of said blocks (first block) is soluble in the non-aqueous dispersion medium and at least another of said blocks (second block) is insoluble in the non-aqueous dispersion medium. The insoluble second block provides an anchor segment for attachment to the copolymer by physical adsorption processes, as for example, by van der Waals forces. Therefore, their main criterion for success as an anchor is to be relatively immiscible in the dispersing medium. The soluble first block of the dispersing agent provides a sheath around the otherwise insoluble copolymer and maintains the copolymeric product as numerous small discrete particles rather than an agglomerated or highly coalesced mass. The insoluble second block may, if desired, contain a plurality of pendent groups.

The soluble first block of the dispersing agent comprises at least 8 percent by weight of the total dispersion copolymer including the dispersing agent and the copolymer in outlet stream 24. The insoluble second block of the dispersing agent is prepared in-situ during the continuous polymerization of the SBR-type random copolymer, therefore the second block has the same composition as the copolymer, formed during the dispersion copolymerization process. The total dispersion copolymer composition contains 8 percent by weight to 20 percent by weight of the soluble first block and about 80 to about 92 percent by weight of the insoluble second block and copolymer, or specifically from 10 to 12 weight percent of the first block and 88 to about 90 percent by weight of the second block and copolymers. The number average molecular weights $M_n$ of the first block is from 500 to 200,000 g/mol, or from 1,000 to 100,000 g/mol. The number average molecular weights of the second block is the same as the copolymer, namely from 20,000 to 2,500,000 g/mol, or from 75,000 to 500,000 g/mol.

The soluble first block is a polymer formed from 75 to 100 parts by weight, or 75 to 98 parts of conjugated diene monomer and 0 to 25 parts by weight, or 2 to 25 parts, of vinyl aromatic monomer with all polymer or copolymer blocks being soluble in the hydrocarbon dispersion medium. The insoluble second block can be prepared by the copolymerization of 30 to 70 parts by weight of conjugated diene monomer and 35 to 70 parts by weight of vinyl aromatic monomer. The dispersing agents prepared in-situ and used in the preparation of the SBR copolymers are recovered as a blend with the copolymer. The dispersing agents are prepared and present in an amount ranging from about 2 to 50% by wt. by weight of the total weight of the dispersion copolymer which includes the dispersing agent and the copolymer in the outlet stream 24.

The continuous polymerization reactions in the first polymerization reactor 10 and second polymerization reactor 20 can be run at a temperature range from 0° C. to 155° C. In one embodiment, the reaction temperature is 90° C. to 130° C., which may occur naturally due to the exothermic polymerization reaction. The reactor residence time in such a continuous polymerization will vary with the reaction temperature, monomer concentration, catalyst system, and catalyst level. Generally, this reactor residence time will vary from about 10 minutes up to 60 minutes, or from 15 minutes to 45 minutes. It is desirable to conduct this polymerization in an oxygen and moisture free environment.

Referring again to FIG. 1, after the outlet stream 24 exits the second polymerization reactor 20, coupling agent 26 may be added into the outlet stream 24. In one embodiment, the coupling agent is added with the non-aqueous dispersing medium. In operation, the coupling agent 26 attaches to the copolymer of the outlet stream 24 to increase the molecular weight and Mooney viscosity of the copolymer. As shown, the coupling agent 26 may be fed to the outlet stream 24 upstream of a downstream recovery vessel 30 that recovers the dispersed copolymer and the dispersing agent from the second polymerization reactor 20. The addition of the coupling agent 26 downstream of the second polymerization reactor 20 but upstream of the recovery vessel 30 may be described as feeding the coupling agent 26 "in-line". Upon addition of the coupling agent 26 to the outlet stream 24, the coupling agent 26 reacts with the dispersion such that the coupling agent may react and attach to the copolymer.

In addition to providing further residence time for the reaction of coupling agent and copolymer, the recovery vessel 30 may also be used to terminate the copolymer. Thus, additional components may be added to the recovery vessel 30. For example, the one or more polymerization terminating agents (for example, isopropanol or water) may be added. Additional additives such as extender oil and antioxidant may also be added.

The coupled copolymer 32 exiting the recovery vessel 30 can be recovered from the non-aqueous dispersion medium (e.g., hydrocarbon solvent) by steam desolventization or by drum drying techniques thus providing energy savings due to higher solids levels. By proper control of particle size, the copolymers can be recovered by filtration or centrifugation techniques.

Coupled Copolymer

The coupled copolymer may include at least 30% by weight of the second vinyl aromatic monomer and at least 10% by weight of the second conjugated diene monomer. In further embodiments, the coupled copolymer may include at least 33%, at least 35%, or at least 38% by weight of the second vinyl aromatic monomer and at least 15%, at least 20%, at least 25%, at least 30%, or at least 35% by weight of the second conjugated diene monomer. The number average molecular weights of the coupled copolymer may be from 75000 to 500000 g/mol. The coupled copolymer may have a Mooney viscosity from 120 to 160.

Reactors

The first polymerization reactor 10 and the second polymerization reactor 20 downstream of the first polymerization reactor 20 may include various contemplated reaction vessels familiar to the skilled person. During polymerization, it may be desirable to provide some form of agitation or stirring to the first polymerization reactor 10 and the second polymerization reactor 20. Consequently, embodiments may include continuous stirred tank reactors as depicted for the first polymerization reactor 10 and the second polymerization reactor 20 in the FIGURE.

Monomers

The first conjugated diene monomer and the second conjugated diene monomer refer to monomer compositions having at least two double bonds that are separated by a single bond. The processes discussed herein may use at least one conjugated diene monomer containing less than 20 carbon atoms (i.e., 4 to 19 carbons), from 4 to 12 carbon atoms, or from 4 to 8 carbons. Examples of conjugated diene monomers include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization. In one embodiment, the first conjugated diene monomer is a 1,3-butadiene monomer. In a further embodiment, the first and second conjugated diene monomers comprise 1,3-butadiene.

The first vinyl aromatic monomer and the second vinyl aromatic monomer may include any vinyl or α-methyl vinyl aromatic compounds capable of being polymerized by an anionic initiator. Particularly useful monomers for this purpose are vinyl aryl and α-methyl-vinyl aryl compounds such as styrene, α-methyl styrene, vinyl toluene, vinyl naphthalene, α-methyl-vinyl toluene, vinyl diphenyl, and corresponding compounds in which the aromatic nucleus may have other alkyl derivatives up to a total of 8 carbon atoms. Certain vinyl aromatic monomers are not suitable for use in this dispersion polymerization process because homopolymers of these monomers are soluble in linear alkane solvents such as hexane and their copolymers with diene are also soluble. A specific example of an unsuitable monomer type is t-butyl styrene. In one or more embodiments, the first and second conjugated diene monomers comprise butadiene, and wherein the first and second vinyl aromatic monomers comprise styrene Non-Aqueous Dispersion Medium The non-aqueous dispersing medium used in the present polymerization process are aliphatic hydrocarbons, preferably linear aliphatic hydrocarbons, including butane, pentane, hexane, heptane, octane, nonane, and branched aliphatic hydrocarbons, including isopentane, isohexane, isoheptane, isooctane, and isononane, and the like and mixtures thereof.

A specific solvent for use as a dispersing medium in the present process is isohexane. While the solvent may consist of up to 100% of non-cyclic or linear aliphatic hydrocarbons, preferably up to 70% of non-cyclic or linear aliphatic hydrocarbons, up to 30% by weight of the total solvent can be provided by at least one alicyclic hydrocarbon such as cyclopentane, methylcyclopentane, cyclohexane, methylcyclohexane and aromatic hydrocarbons such as benzene and toluene. A higher percentage of VAM units in the SBR allows for a higher percentage of non-aliphatic linear hydrocarbons to be present in a solvent mixture.

The solvent may be selected such that the Hansen solubility parameter is less than 7.6 $(cal/mL)^{1/2}$, less than 7.5 $(cal/mL)^{1/2}$, or even less than 7.4 $(cal/mL)^{1/2}$. The methodology for computing the Hansen Solubility parameters is provided in the *Handbook of Solubility Parameters*, Allan F. M. Barton. Ph.D., CRC Press, 1983.

Organolithium Polymerization Initiator

The organolithium polymerization initiator catalyst systems are anionic initiators for use in preparing the SBR copolymers and the dispersing agent, for example, any organolithium catalyst which is known in the art as being useful in the polymerization of vinyl aromatic hydrocarbons and conjugated dienes. Suitable organolithium polymerization initiator which initiate polymerization of the monomer system and dispersing agent include organolithium catalysts which have the formula $R(Li)_x$ where R represents a hydrocarbyl radical of 1 to 20, preferably 2-8, carbon atoms per R group, and x is an integer of 1-4, preferably 1 or 2. Typical R groups include aliphatic radicals and cycloaliphatic radicals, such as alkyl, cycloalkyl, cycloalkylalkyl, alkylcycloalkyl, aryl and alkylaryl radicals.

Specific examples of R groups for substitution in the above formula include primary, secondary and tertiary groups such as methyl, ethyl, n-propyl, isopropyl, n-butyl, isobutyl, t-butyl, n-amyl, isoamyl, n-hexyl n-octyl, n-decyl, cyclopentyl-methyl, cyclohexyl-ethyl, cyclopentyl-ethyl, methyl-cyclopentylethyl, cyclopentyl, cyclohexyl, 2,2,1-bicycloheptyl, methylcyclopentyl, dimethylcyclopentyl, ethylcyclopentyl, methylcyclohexyl, dimethylcyclohexyl, ethylcyclohexyl, iso-propylcyclohexyl, and the like.

Specific examples of other suitable lithium catalyst include: phenyllithium, naphthyllithium, 4-butylphenyllithium, p-tolyllithium, 4-phenylbutyllithium; 4-butyl-cyclohexyllithium, 4-cyclohexylbutyllithium, 1,4-dilithiobutane, 1,10-dilithio-decane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicoxane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

Mixtures of different organolithium polymerization initiators can also be employed, preferably containing one or more lithium compounds such as $R(Li)_x$. In one embodiment, the organolithium polymerization initiator for use in the present disclosure is n-butyllithium.

Other organolithium polymerization initiators which can be employed are lithium dialkyl amines, lithium dialkyl phosphines, lithium alkyl aryl phosphines, lithium diaryl phosphines and trialkyl tin lithium such as tributyl-tin-lithium.

Organolithium polymerization initiators are typically charged in amounts ranging from 0.2 millimoles to 20 millimoles of organolithium polymerization initiator per hundred grams of total monomer into the reaction vessels. All amounts of organolithium polymerization initiator are indicated by hundred grams of monomer or by ratio of components in the instant process and are considered to be catalytically effective amounts, that is, effective amounts for initiating and conducting polymerization of the blocks of the dispersing agent and the disclosed monomer systems to produce copolymers of the present disclosure.

For example, 0.5 to 200 mmoles of the organolithium polymerization initiator per hundred grams of monomer may be used to prepare the first block of the dispersing agent. A second stream of 0.2 to 20 mmoles of organolithium polymerization initiator, is then added to the second polymerization reactor to simultaneously produce second block of the dispersing agent and the copolymer from vinyl aromatic monomers and conjugated diene monomers. The copolymer may be considered a separate block. In one or more embodiments, 10 to 50 percent by weight of the total amount of the organolithium polymerization initiator added to the first and second polymerization reactors is added to the first polymerization reactor. In further embodiments, 20 to 40 percent by weight, or from 25 to 35 percent by weight of the organolithium polymerization initiator is used in the preparation of the first block. Conversely, the remaining 50 to 90 percent by weight of organolithium polymerization initiator is charged during the in-situ preparation of the second block and copolymer. In further embodiments, 60 to 80 percent by weight, or from 65 to 75 percent by weight of the organolithium polymerization initiator is used during the in-situ preparation of the second block and copolymer.

Randomizing Agent

Various randomizing agent compositions suitable to promote random copolymerization of the vinyl aromatic monomers and conjugated diene monomers are contemplated. These may include oligomeric oxolanyl propane, tetrahydrofuran, tetramethylethylene diamine, diethylether, ditetrahydrofurlypropane, and the like. In one embodiment, the randomizing agent comprises 2,2-ditetrahydrofurlypropane. In another embodiment, the randomizing agent comprises the meso form of ditetrahydrofurlypropane as described in U.S. Pat. No. 9,868,795, which is incorporated by reference in its entirety. Randomizing agents may be employed in the polymerization system in amounts generally ranging from a molar ratio of 1:100 to 4:1 of randomizing agent to organolithium polymerization initiator.

Modifying Agent

As used herein, modifying agents encompasses additives that impact the final properties of the copolymer, such as by broadening the molecular weight distribution (MWD=Mw/Mw) or adjusting the vinyl content of the copolymer. In one embodiment, the modifying agent comprises 1,2-butadiene. The 1,2-butadiene may be considered a gel suppressant and as such can be used to impact molecular weight distribution. It is often used at a low level because it can also react with catalyst and have a negative impact on coupling.

Coupling Agent

For the coupling agents, various components are considered suitable for attaching to the copolymer to increase the molecular weight and the Mooney viscosity of the copolymer. In one or more embodiments, the coupling agent may comprise non-organometallic aromatic triester coupling agents. Suitable non-organometallic aromatic triester coupling agents may be defined by the following Formula I:

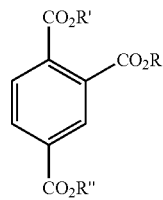

Formula I where R, R' and R" are independently selected from hydrocarbyl groups containing 1 to 20 carbons. Specific non limiting examples include trimethyl 1,2,4-benzenetricarboxylate, triethyl 1,2,4-benzenetricarboxylate, tripropyl 1,2,4-benzenetricarboxylate, tributyl 1,2,4-benzenetricarboxylate, tripentyl 1,2,4-benzenetricarboxylate, trihexyl 1,2,4-benzenetricarboxylate, triheptyl 1,2,4-benzenetricarboxylate, tricyclohexyl 1,2,4-benzenetricarboxylate, trioctyl 1,2,4-benzenetricarboxylate, tri(2-ethylhexyl) 1,2,4-benzene tricarboxylate, trinonyl 1,2,4-benzenetricarboxylate, tridecyl 1,2,4-benzenetricarboxylate, tridodecyl 1,2,4-benzenetricarboxylate, butyldimethyl 1,2,4-benzenetricarboxylate, and butyldiethyl 1,2,4-benzenetricarboxylate. Exemplary examples of non-organometallic trimellitate ester coupling agents are tri-2-ethylhexyl trimellitate also known as tri(2-ethylhexyl) 1,2,4-benzene tricarboxylate or triisononyl trimellitate also known as trinonyl 1,2,4-benzenetricarboxylate.

In another embodiment the non-organometallic aromatic triester coupling agents are of the following Formula II:

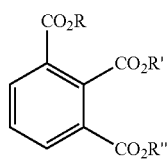

Formula II where R, R' and R" are independently selected from hydrocarbyl groups containing 1 to 20 carbons. Specific non limiting examples include trimethyl 1,2,3-benzenetricarboxylate, triethyl 1,2,3-benzenetricarboxylate, tripropyl 1,2,3-benzenetricarboxylate, tributyl 1,2,3-benzenetricarboxylate, tripentyl 1,2,3-benzenetricarboxylate, trihexyl 1,2,3-benzenetricarboxylate, triheptyl 1,2,3-benzenetricarboxylate, tricyclohexyl 1,2,3-benzenetricarboxylate, trioctyl 1,2,3-benzenetricarboxylate, tri(2-ethylhexyl) 1,2,3-benzene tricarboxylate, trinonyl 1,2,3-benzenetricarboxylate, tridecyl 1,2,3-benzenetricarboxylate, tridodecyl 1,2,3-benzenetricarboxylate, butyldimethyl 1,2,3-benzenetricarboxylate, and butyldiethyl 1,2,3-benzenetricarboxylate. Exemplary examples of non-organometallic trimellitate ester coupling agents are tri-2-ethylhexyl hemimellitate also known as tri(2-ethylhexyl) 1,2,3-benzene tricarboxylate or triisononyl hemimellitate also known as trinonyl 1,2,3-benzenetricarboxylate.

In another embodiment, the non-organometallic aromatic triester coupling agents are of the following Formula III:

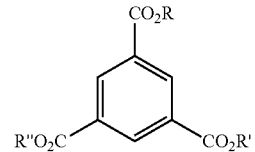

Formula III where R, R' and R" are independently selected from hydrocarbyl groups containing 1 to 20 carbons. Specific non limiting examples include trimethyl 1,3,5-benzenetricarboxylate, triethyl 1,3,5-benzenetricarboxylate, tripropyl 1,3,5-benzenetricarboxylate, tributyl 1,3,5-benzenetricarboxylate, tripentyl 1,3,5-benzenetricarboxylate, trihexyl 1,3,5-benzenetricarboxylate, triheptyl 1,3,5-benzenetricarboxylate, tricyclohexyl 1,3,5-benzenetricarboxylate, trioctyl 1,3,5-benzenetricarboxylate, tri(2-ethylhexyl) 1,3,5-benzene tricarboxylate, trinonyl 1,3,5-benzenetricarboxylate, tridecyl 1,3,5-benzenetricarboxylate, tridodecyl 1,3,5-benzenetricarboxylate, butyldimethyl 1,3,5-benzenetricarboxylate, and butyldiethyl 1,3,5-benzenetricarboxylate. Exemplary examples of non-organometallic trimellitate ester coupling agents are tri-2-ethylhexyl trimesitate also known as tri(2-ethylhexyl) 1,3,5-benzene tricarboxylate or triisononyl trimesitate also known as trinonyl 1,3,5-benzenetricarboxylate.

In an exemplary embodiment, the coupling agent comprises trioctyl trimellitate.

In another embodiment, the coupling agent comprises metal halides, metalloid halides, alkoxysilanes, and alkoxystannanes.

In one or more embodiments, useful metal halides or metalloid halides may be selected from the group comprising compounds expressed by the formula (1) $R^1_n M^1 X_{4-n}$, the formula (2) $M^1 X_4$, and the formula (3) $M^2 X_3$, where $R^1$ is the same or different and represents a monovalent organic group with carbon number of 1 to about 20, $M^1$ in the formulas (1) and (2) represents a tin atom, silicon atom, or germanium atom, $M^2$ represents a phosphorus atom, X represents a halogen atom, and n represents an integer of 0-3.

Exemplary compounds expressed by the formula (1) include halogenated organic metal compounds, and the compounds expressed by the formulas (2) and (3) include halogenated metal compounds.

In the case where $M^1$ represents a tin atom, the compounds expressed by the formula (1) can be, for example, triphenyltin chloride, tributyltin chloride, triisopropyltin chloride, trihexyltin chloride, trioctyltin chloride, diphenyltin dichloride, dibutalin dichloride, dihexyltin dichloride, dioctyltin dichloride, phenyltin trichloride, butyltin trichloride, octyltin trichloride and the like. Furthermore, tin tetrachloride, tin tetrabromide and the like can be exemplified as the compounds expressed by formula (2).

In the case where $M^1$ represents a silicon atom, the compounds expressed by the formula (1) can be, for example, triphenylchlorosilane, trihexylchlorosilane, trioctylchlorosilane, tributylchlorosilane, trimethylchlorosilane, diphenyldichlorosilane, dihexyldichlorosilane, dioctyldichlorosilane, dibutyldichlorosilane, dimethyldichlorosilane, methyltrichlorosilane, phenyltrichlorosilane, hexyltrichlorosilane, octyltrichlorosilane, butyltrichlorosilane, methyltrichlorosilane and the like. Furthermore, silicon tetrachloride, silicon tetrabromide and the like can be exemplified as the compounds expressed by the formula (2). In the case where $M^1$ represents a germanium atom, the compounds expressed by the formula (1) can be, for example, triphenylgermanium chloride, dibutylgermanium dichloride, diphenylgermanium dichloride, butylgermanium trichloride and the like. Furthermore, germanium tetrachloride, germanium tetrabromide and the like can be exemplified as the compounds expressed by the formula (2). Phosphorus trichloride, phosphorus tribromide and the like can be exemplified as the compounds expressed by the formula (3). In one or more embodiments, mixtures of metal halides and/or metalloid halides can be used.

In one or more embodiments, useful alkoxysilanes or alkoxystannanes may be selected from the group comprising compounds expressed by the formula (4) $R^1{}_n M^1(OR)_{4-n}$, where $R^1$ is the same or different and represents a monovalent organic group with carbon number of 1 to about 20, $M^r$ represents a tin atom, silicon atom, or germanium atom, OR represents an alkoxy group where R represents a monovalent organic group, and n represents an integer of 0-3.

Exemplary compounds expressed by the formula (4) include tetraethyl orthosilicate, tetramethyl orthosilicate, tetrapropyl orthosilicate, tetraethoxy tin, tetramethoxy tin, and tetrapropoxy tin.

Rubber Compositions

The recovered coupled copolymer products, depending on their molecular weights and compositions, can be used for a variety of goods such as tires and various rubber molded products.

EXAMPLES

Referring to the FIGURE, polymerization was conducted in a pilot plant including two 20 gallon reactors connected in series. As shown in the following Table 1, feed ingredients were metered to the bottom of the first polymerization reactor 10 through first monomer charge stream 14 and through feed stream 12. The resultant first block 16 was continuously fed to the second polymerization reactor 20, to which the following additional ingredients were added through feed stream 18 and second monomer change 22.

TABLE 1

Pilot Plant Feed Streams

| Stream | Feed Components |
|---|---|
| 12 | 0.341 kg/min Hexane |
|  | 91 g/hr 1.5% BuLi in hexane |
| First Monomer Charge 14 | 0.125 kg/min of butadiene/hexane blend (21% butadiene) |
|  | 0.010 kg/min of styrene/hexane blend (33% styrene) |
|  | 38 g/hr of 40% 2,2-ditetrahydrofurlypropane in hexane |
| 18 | 107 g/hr 3% BuLi in hexane |
| Second Monomer Charge 22 | 0.709 kg/min of butadiene/hexane blend (21% butadiene) |
|  | 0.407 kg/min of styrene/hexane blend (33% styrene) |
|  | 29 g/hr 2% 1,2-Butadiene in hexane |
| Coupling Agent 26 | 122 g/hr 5% TOTM (trioctyl trimellitate) in hexane |

The resultant dispersion 24 was continuously fed to recovery vessel 30. A coupling agent TOTM was added to the transfer line at the exit of the second polymerization reactor 20 upstream of recovery vessel 30.

Jacket temperatures were adjusted to keep the internal temperatures at a level to support 98-100% conversion of monomer into polymer at the end of the second polymerization reactor 20.

In the recovery vessel 30, the copolymer was terminated with isopropanol at a level of about 0.5% w/w to polymer. Antioxidant (Santoflex 6PPD) was then added at a level of 0.75% w/w to polymer, B0125 Hyprene (Ergon Refining, Inc.) was added at 37.5% w/w to polymer and the dispersion mixed for two hours. The cement was then steam desolventized and dried of residual water down to a level of 0.75% or below to achieve a final product. The properties of this example (Example 1) are provided in Table 2 below.

As shown in Table 2, the Mooney and GPC values of Example 1 are compared for a conventional solution polymerized continuous SBR (Comparative Example 1).

TABLE 2

Comparison to conventional random SBR produced by solution polymerization

| Example | Comparative Example 1 | Example 1 |
|---|---|---|
| Base Mooney Viscosity (ML4) | 104 | 100 |
| Coupled Mooney Viscosity (ML4) | 163 | 144 |
| Final Mooney Viscosity (ML4) | 60.5 | 50.9 |
| Oil (phm) | 37 | 33 |
| Solids (%) | 17% | 20% |
| Styrene (% by weight) | 40.3 | 38.5 |
| Vinyl (% by weight) | 38.5 | 40.0 |
| Mp (kg/mol) | 664 | 642 |
| MWD | 2.79 | 2.65 |

As shown, all of the values achieved in Example 1 are comparable to the Comparative Example 1 rubber, which is produced by solution polymerization; however, the amount of solids produced in the solution polymerization process is lower than the solids amount produced in Example 1, which utilized the present anionic dispersion polymerization process.

The following examples in Table 3 were prepared as follows:

TABLE 3

Pilot Plant Feed Streams

| Stream | Feed Component | Ex 2 | Ex 3 | Ex 4 | Ex 5 |
|---|---|---|---|---|---|
| 12 | Hexane, kg/min | 0.486 | 0.409 | 0.359 | 0.386 |
|  | 1.5% BuLi in hexane, g/hr | 80 | 90 | 93 | 105 |
| $1^{st}$ Monomer Charge 14 | 21% Butadiene in hexane, kg/min | 0.123 | 0.136 | 0.127 | 0.132 |
|  | 33% Styrene in hexane, g/min | 9.1 | 9.1 | 9.1 | 13.6 |
|  | 40% 2,2-ditetrahydrofurlypropane in hexane, g/hr | 35 | 37 | 37 | 38 |
| 18 | 3% BuLi in hexane, g/hr | 77 | 101 | 107 | 121 |
| $2^{nd}$ Monomer Charge 22 | 21% Butadiene in hexane, kg/min | 0.695 | 0.768 | 0.750 | 0.755 |
|  | 33% Styrene in hexane, kg/min | 0.30 | 0.30 | 0.37 | 0.33 |
|  | 2% 1,2-Butadiene in hexane, g/hr | 39 | 37 | 29 | 34 |
| Coupling Agent 26 | 5% TOTM in hexane, g/hr | 127 | 88 | 122 | 192 |

Referring to Table 4 below, Examples 2 and 3 had coupled measurements taken after having at least 2.5 minutes of residence time in the recovery vessel 30. Examples 4 and 5 had coupled measurements taken upstream of the recovery vessel 30, thus these examples had less coupling residence time. Like Comparative Example 1, Comparative Example 2 (CE2) is and SBR produced by solution polymerization.

TABLE 4

Polymer Properties

| | Reactor 2 | | First Block | | | Disp. Rtg. | FTIR | | Cpld ML4 | Cpld T80 | Gel Permeation Chromatography (GPC) | | |
|---|---|---|---|---|---|---|---|---|---|---|---|---|---|
| | ML4 | T-80 | % TS | % Mon. | % Sty. | % Cat. | | % Sty. | % Vinyl | | | Mn | Mw | MWD |
| C2 | 149.2 | >60 | 17.0 | | | | | 41.9 | 37.3 | 149.2 | >60 | 231852 | 588683 | 2.54 |
| Ex 2 | 129.7 | 23.8 | 18.5 | 10.0 | 10.0 | 32.7 | 4 | 42.1 | 40.7 | 141.8 | >60 | 298161 | 742081 | 2.49 |
| Ex 3 | 99.0 | 15.2 | 18.5 | 10.0 | 10.0 | 30.9 | 5 | 38.5 | 40.1 | 144.3 | >60 | 241895 | 641174 | 2.65 |
| Ex 4 | 112.3 | 29.0 | 20.0 | 10.0 | 10.0 | 30.3 | 4 | 41.6 | 40.4 | 138.7 | >120 | 221650 | 720492 | 3.25 |
| Ex 5 | 97.2 | 26.8 | 20.0 | 10.0 | 10.0 | 30.3 | 4 | 42.1 | 40.1 | 134.5 | >60 | 171390 | 597797 | 3.49 |

% Mon. = % Monomer
% Sty. = % Styrene
% Cat. = % Catalyst
Cpld = Coupled
Disp. Rtg. = Dispersion Rating As shown, Examples 2 and 3, which had increased residence time in the recovery vessel, had higher coupled Mooney viscosity than Examples 4 and 5 and slightly lower Mooney Viscosity than the control. For the dispersion rating, Examples 2-5 all achieved good to excellent dispersions according to the Dispersion Ratings defined below. As compared to CE2, Example 2-5 all desirable achieve higher total solids than the solution polymerized CE2. Moreover, Examples 2-5 all had higher vinyl content than the solution polymerized CE2.

The following example in Table 5 was prepared as follows:

TABLE 5

Pilot Plant Feed Streams

| Stream | Feed Component | Ex 6 |
|---|---|---|
| 12 | Hexane, kg/min | 0.370 |
|  | 1.5% BuLi in hexane, g/hr | 80 |
| 1st Monomer | 22.8% Butadiene in hexane, kg/min | 0.139 |
| Charge 14 | 33.3% 2,2-ditetrahydrofurylpropane in hexane, g/hr | 20 |
| 18 | 3% BuLi in hexane, g/hr | 150 |
| 2nd Monomer | 22.8% Butadiene in hexane, kg/min | 0.738 |
| Charge 22 | 34.5% Styrene in hexane, kg/min | 0.341 |
|  | 1% 1,2-Butadiene in hexane, g/hr | 61 |
| Coupling Agent 26 | 2% TOTM in hexane, g/hr | 333 |

Referring to Table 6 below, the Mooney and GPC values of Example 6 are shown. Referring to Table 7 below, Example 6 had coupled measurements taken upstream of the recovery vessel 30, thus this example had relatively less coupling residence time.

TABLE 6

Mooney and GPC values

| Example | Example 6 |
|---|---|
| Base Mooney Viscosity (ML4) | 105 |
| Coupled Mooney Viscosity (ML4) | 165 |
| Final Mooney Viscosity (ML4) | 60 |
| Oil (phm) | 39 |
| Solids (%) | 20% |
| Styrene (% by weight) | 41.7 |
| Vinyl (% by weight) | 36.0 |
| Mp (kg/mol) | 470,117 |
| MWD | 2.72 |

| Rating Score | Meaning of Rating Score |
|---|---|
| 5 | Excellent dispersion, low viscosity for base copolymer and coupled copolymer |
| 4 | Good dispersion, slightly higher viscosity for base copolymer and coupled copolymer |
| 3 | Fair dispersion, more viscous, particularly for coupled copolymer |
| 2 | Poor dispersion, high viscosity for base copolymer and coupled copolymer |
| 1 | No dispersion |

TABLE 7

Polymer Properties

| | Reactor 2 | | | First Block | | | | FTIR | | Cpld | Cpld | Gel Permeation Chromatography (GPC) | | |
|---|---|---|---|---|---|---|---|---|---|---|---|---|---|---|
| | ML4 | T-80 | % TS | % Mon. | % Sty. | % Cat. | Disp. Rtg. | % Sty. | % Vinyl | ML4 | T80 | Mn | Mw | MWD |
| Ex 6 | 105.52 | N/T | 20 | 10 | 0 | 21.10 | 4 | 41.7 | 36.0 | 165.45 | >120 | 337,002 | 917,148 | 2.72 |

As shown, Example 6, which included only butadiene in the 1st monomer charge, achieved the same amount of solids as Examples 1, 4, and 5 and achieved a greater amount of solids as Examples 2 and 3, all of which included both butadiene and styrene in the 1st monomer charge.

Testing Methods

Mooney Viscosity: The Mooney viscosities of polymers disclosed herein were determined at 100° C. using an Alpha Technologies Mooney viscometer with a large rotor, a one minute warm-up time, and a four minute running time. More specifically, the Mooney viscosity was measured by pre-heating each polymer to 100° C. for one minute before the rotor starts. The Mooney viscosity was recorded for each sample as the torque at four minutes after the rotor started. Torque relaxation was recorded after completing the four minutes of measurement. $t_{80}$ was taken as time required for decaying 80% of the torque of each polymer. The method follows ASTM D-1646.

Gel Permeation Chromatography (GPC)

The molecular weight ($M_n$, $M_w$ and $M_p$-peak, $M_n$ of GPC curve) and molecular weight distribution ($M_w/M_n$) of the polymers were determined by GPC. The GPC measurements disclosed herein are calibrated with polystyrene standards and Mark-Houwink constants for the polystyrenes produced.

Fourier Transform Infrared Spectroscopy (FTIR)

The % Styrene and % Vinyl of the polymers were determined by FTIR. Specifically, the samples are dissolved in carbon disulfide and subjected to FTIR on a Perkin Elmer Spectrum GX instrument.

Dispersion Rating

The following rating system was used to evaluate the dispersion product in the present processes. The dispersion products were placed in a clear glass bottle and evaluated with the naked eye, upon which a score from below was provided.

One or more aspects are disclosed in the present specification. According to a first aspect, a process for producing a copolymer by anionic dispersion polymerization comprises: adding to a first polymerization reactor: a first monomer charge comprising a first conjugated diene monomer and optionally a first vinyl aromatic monomer; organolithium polymerization initiator; and a non-aqueous dispersing medium, wherein the first monomer charge is polymerized to form a first block of a dispersing agent, the first block being soluble in the non-aqueous dispersing medium, and wherein at least 8% by wt of total monomer is provided by the first monomer charge, the total monomer being the sum of all monomer charges; and adding to a second polymerization reactor: the first block, the non-aqueous dispersing medium, the second monomer charge comprising a second vinyl aromatic monomer and a second conjugated diene monomer; and organolithium polymerization initiator, wherein the second monomer charge is polymerized to form the copolymer, the copolymer being the polymerized reaction product of at least 30% by weight of the second vinyl aromatic monomer and at least 10% by weight of the second conjugated diene monomer, and wherein the second polymerization reactor produces an outlet stream comprising the copolymer and the second block of the dispersing agent, the second block being insoluble in the non-aqueous dispersing medium and linked with the first block to form the dispersing agent, and wherein the dispersing agent disperses the copolymer in the non-aqueous dispersing medium.

A second aspect includes any of the preceding aspects, further comprising adding coupling agent into the outlet stream, wherein the coupling agent attaches to the copolymer to increase the Mooney viscosity of the copolymer.

A third aspect includes any of the preceding aspects, wherein the total monomer comprises 10 to 20% by weight of the first monomer charge.

A fourth aspect includes any of the preceding aspects, wherein the outlet stream comprises from 15 to 30% by weight of solids.

A fifth aspect includes any of the preceding aspects, further comprising recovering the dispersed copolymer and the dispersing agent from the second polymerization reactor in a downstream recovery vessel after the addition of coupling agent.

A sixth aspect includes any of the preceding aspects, wherein the first monomer charge comprises 75 to 98% by weight first conjugated diene monomer, and 2 to 25% by weight first vinyl aromatic monomer.

A seventh aspect includes any of the preceding aspects, wherein the coupling agent comprises trioctyl trimellitate.

An eighth aspect includes any of the preceding aspects, wherein the coupling agent is added with non-aqueous dispersing medium.

A ninth aspect includes any of the preceding aspects, wherein the non-aqueous dispersing medium comprises an aliphatic alkane.

A tenth aspect includes any of the preceding aspects, herein the non-aqueous dispersing medium comprises isohexane.

An eleventh aspect includes any of the preceding aspects, wherein the organolithium polymerization initiator is butyl lithium.

A twelfth aspect includes any of the preceding aspects, wherein the first and second conjugated diene monomers comprise butadiene, and wherein the first and second vinyl aromatic monomers comprise styrene.

A thirteenth aspect includes any of the preceding aspects, wherein the organolithium polymerization initiator added to the first polymerization reactor provides 20 to 40% by weight of the total amount of the organolithium polymerization initiator added to first and second polymerization reactors.

A fourteenth aspect includes any of the preceding aspects, wherein a randomizing agent is added to the first polymerization reactor, the second polymerization reactor, or both.

A fifteenth aspect includes any of the preceding aspects, wherein the randomizing agent comprises oligomeric oxolanyl propane.

A sixteenth aspect includes any of the preceding aspects, wherein a modifying agent is added to the first polymerization reactor, the second polymerization reactor, or both.

A seventeenth aspect includes any of the preceding aspects, wherein the copolymer has a number average molecular weight from 75000 to 500000 g/mol.

An eighteenth aspect includes any of the preceding aspects, wherein the copolymer has a Mooney viscosity from 120 to 160.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

What is claimed is:

1. A process for producing a copolymer by anionic dispersion polymerization comprising:
adding to a first polymerization reactor: a first monomer charge comprising a first conjugated diene monomer and optionally a first vinyl aromatic monomer; organolithium polymerization initiator; and a non-aqueous dispersing medium,
wherein the first monomer charge is polymerized to form a first block of a dispersing agent, the first block being soluble in the non-aqueous dispersing medium, and
wherein at least 8% to 20% by wt of total monomer is provided by the first monomer charge, the total monomer being the sum of all monomer charges; and
adding to a second polymerization reactor: the first block, the non-aqueous dispersing medium, a second monomer charge comprising a second vinyl aromatic monomer and a second conjugated diene monomer; and organolithium polymerization initiator,
wherein the second monomer charge is polymerized to form the copolymer, the copolymer being the polymerized reaction product of at least 30% to 90% by weight of the second vinyl aromatic monomer, based on a total weight of the copolymer, and at least 10% to 70% by weight of the second conjugated diene monomer, based on the total weight of the copolymer, and
wherein the second polymerization reactor produces an outlet stream comprising the copolymer and a second block of the dispersing agent, the second block being insoluble in the non-aqueous dispersing medium and linked with the first block to form the dispersing agent, and
wherein the dispersing agent disperses the copolymer in the non-aqueous dispersing medium,
adding coupling agent into the outlet stream, wherein the coupling agent attaches to the copolymer to increase the Mooney viscosity of the copolymer, wherein the coupling agent comprises a non-organometallic aromatic triester coupling agent.

2. The process of claim 1, wherein the total monomer comprises 10 to 20% by weight of the first monomer charge.

3. The process of claim 1, wherein the outlet stream comprises from 15 to 30% by weight of solids.

4. The process of claim 1, further comprising recovering the dispersed copolymer and the dispersing agent from the second polymerization reactor in a downstream recovery vessel after the addition of coupling agent.

5. The process of claim 1, wherein the first monomer charge comprises 75 to 98% by weight first conjugated diene monomer, and 2 to 25% by weight first vinyl aromatic monomer.

6. The process of claim 1, wherein the coupling agent comprises trioctyl trimellitate.

7. The process of claim 1, wherein the coupling agent is added with non-aqueous dispersing medium.

8. The process of claim 1, wherein the non-aqueous dispersing medium comprises at least one of a linear aliphatic hydrocarbon and a branched aliphatic hydrocarbon, the linear aliphatic hydrocarbon comprising butane, pentane, hexane, heptane, octane, nonane, or a mixture thereof, the branched aliphatic hydrocarbon comprising isopentane, isohexane, isoheptane, isooctane, isononane, or a mixture thereof.

9. The process of claim 8, wherein the non-aqueous dispersing medium comprises an aliphatic alkane.

10. The process of claim 8, wherein the non-aqueous dispersing medium comprises isohexane.

11. The process of claim 1, wherein the organolithium polymerization initiator is butyl lithium.

12. The process of claim 1, wherein the first and second conjugated diene monomers comprise butadiene, and wherein the first and second vinyl aromatic monomers comprise styrene.

13. The process of claim 1, wherein the organolithium polymerization initiator added to the first polymerization reactor provides 20 to 40% by weight of the total amount of the organolithium polymerization initiator added to first and second polymerization reactors.

14. The process of claim 1, wherein a randomizing agent is added to the first polymerization reactor, the second polymerization reactor, or both.

15. The process of claim 14, wherein the randomizing agent comprises oligomeric oxolanyl propane.

16. The process of claim 1, wherein a modifying agent is added to the first polymerization reactor, the second polymerization reactor, or both.

17. The process of claim 1, wherein the copolymer has a number average molecular weight from 75000 to 500000 g/mol.

18. The process of claim 1, wherein the copolymer has a Mooney viscosity from 120 to 160.

19. The process of claim 1, wherein the first and second conjugated diene monomers are compositionally the same and the first and second vinyl aromatic monomers are compositionally the same.

20. The process of claim 1, wherein the first and second conjugated diene monomers comprise 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, or a mixture thereof, and the first and second vinyl aromatic monomers comprise styrene, a-methyl styrene, vinyl toluene, vinyl naphthalene, a-methyl-vinyl toluene, vinyl diphenyl, or a mixture thereof.

* * * * *